US011082283B2

(12) United States Patent
Trim et al.

(10) Patent No.: US 11,082,283 B2
(45) Date of Patent: Aug. 3, 2021

(54) CONTEXTUAL GENERATION OF EPHEMERAL NETWORKS

(71) Applicant: International Business Machines Corporation, Armonk, NY (US)

(72) Inventors: Craig M. Trim, Ventura, CA (US); Shikhar Kwatra, Durham, NC (US); Jennifer Szkatulski, Rochester, MI (US); Adam Lee Griffin, Dubuque, IA (US); Michael Nicholas Virnoche, Flowery Branch, GA (US)

(73) Assignee: International Business Machines Corporation, Armonk, NY (US)

( * ) Notice: Subject to any disclaimer, the term of this patent is extended or adjusted under 35 U.S.C. 154(b) by 64 days.

(21) Appl. No.: 16/578,447

(22) Filed: Sep. 23, 2019

(65) Prior Publication Data
US 2021/0091995 A1 Mar. 25, 2021

(51) Int. Cl.
*H04W 4/02* (2018.01)
*H04L 12/24* (2006.01)
(Continued)

(52) U.S. Cl.
CPC ........ *H04L 41/046* (2013.01); *G06F 16/9035* (2019.01); *H04L 9/0643* (2013.01);
(Continued)

(58) Field of Classification Search
CPC ... H04L 41/046; H04L 41/0893; H04L 43/08; H04L 9/0643; H04W 4/02; G06F 16/9035; G06F 15/16; G06F 17/40
See application file for complete search history.

(56) References Cited

U.S. PATENT DOCUMENTS

| 10,666,334 B2 * | 5/2020 | Xiong | H04L 5/0048 |
| 2011/0276396 A1 * | 11/2011 | Rathod | H04L 51/066 |
| | | | 705/14.49 |

(Continued)

FOREIGN PATENT DOCUMENTS

| CN | 107045650 A | 8/2017 |
| CN | 108701324 A | 10/2018 |
| WO | 2018020373 A1 | 2/2018 |

OTHER PUBLICATIONS

"Move beyond Gdpr compliance", IBM, IBM Security, printed Jul. 17, 2019, 6 pages. https://www.ibm.com/security/data-security/gdpr.

(Continued)

*Primary Examiner* — Wei Zhao
(74) *Attorney, Agent, or Firm* — Timothy T. Singleton

(57) ABSTRACT

A method, system, and computer program product for contextual generation of an ephemeral network are provided. The method detects an initiating event for network generation associated with a user of a first computing device. The method determines a duration of the initiating event. A set of network members is determined based on the initiating event and the duration. The method establishes an ephemeral network, connecting at least a portion of computing devices associated with the set of network members. The ephemeral network is terminated in response to detecting a completion event. In response to terminating the ephemeral network, member information for the set of network members is removed from the portion of the computing devices.

20 Claims, 6 Drawing Sheets

(51) Int. Cl.
  *H04L 12/26* (2006.01)
  *H04L 9/06* (2006.01)
  *G06F 16/9035* (2019.01)
(52) U.S. Cl.
  CPC .......... *H04L 41/0893* (2013.01); *H04L 43/08* (2013.01); *H04L 2209/38* (2013.01)

(56) References Cited

U.S. PATENT DOCUMENTS

| | | | |
|---|---|---|---|
| 2014/0335897 A1* | 11/2014 | Clem | G08G 1/147 455/456.3 |
| 2018/0157999 A1 | 6/2018 | Arora | |
| 2018/0342036 A1 | 11/2018 | Zachary | |
| 2018/0357438 A1 | 12/2018 | Gayton et al. | |

OTHER PUBLICATIONS

"Transform your business with the GDPR", IBM, IBM Analytics, printed Jul. 17, 2019, 12 pages. https://www.ibm.com/data-responsibility/gdpr/.

"The Hertz Corporation Teams With IBM and MindShare Technologies To Gain Deeper Insight Using Analytics", IBM, News Room, Oct. 25, 2010, 2 pages. https://www-03.ibm.com/press/us/en/pressrelease/32859.wss.

"Data Life-Cycles—Privatization & Compliance for Automotive Markets", IP.com Number: IPCOM000257297D, https://priorart.ip.com/IPCOM/000257297, printed Aug. 29, 2019, 3 pages.

\* cited by examiner

CONTEXTUAL GENERATION OF EPHEMERAL NETWORKS

BACKGROUND

Many vehicle manufacturers incorporate infotainment systems into commercially available vehicles. These infotainment systems provide varying types of information, interaction, and connectivity to drivers and passengers of vehicles. Infotainment systems may present information such as maps, navigation information, vehicle camera feeds, messaging, internet browsing, music playback, and other types of audio/visual information. Infotainment systems often enable interaction with presented information through touchscreens, manual controls, wired and wireless connections to mobile computing devices, and other input/output options. Infotainment systems may access and store information from a driver or passenger device based on connection methods and applications used by or presented by the infotainment system. Some infotainment systems access and store user information such as contact information, addresses, navigation routes, locations (e.g., work, home, or favorites), accessed network resources, and even messaging data. This user data may be retained by infotainment systems, intentionally or inadvertently. Users may accept such storage of personal data on a personally owned vehicle. However, storage or retention of such data in temporarily accessed vehicles, such as rental and rideshare vehicles, presents risks to owners of such personal information.

SUMMARY

According to an embodiment described herein, a computer-implemented method for contextual generation of an ephemeral network is provided. The method detects an initiating event for network generation. The initiating event is associated with a user of a first computing device. The method determines a duration of the initiating event. The method then determines a set of network members based on the initiating event and the duration. The set of network members are associated with a set of computing devices. The method establishes an ephemeral network connecting the computing devices associated with the set of network members. The method terminates the ephemeral network in response to detecting a completion event and removes member information for the set of network members in response to terminating the ephemeral network.

According to an embodiment described herein, a system for contextual generation of an ephemeral network is provided. The system includes one or more processors and a computer-readable storage medium, coupled to the one or more processors, storing program instructions that, when executed by the one or more processors, cause the one or more processors to perform operations. The operations include detecting an initiating event for network generation. The initiating event is associated with a user of a first computing device. The system determines a duration of the initiating event. The system then determines a set of network members based on the initiating event and the duration. The set of network members are associated with a set of computing devices. The system establishes an ephemeral network connecting the computing devices associated with the set of network members. The system terminates the ephemeral network in response to detecting a completion event and removes member information for the set of network members in response to terminating the ephemeral network.

According to an embodiment described herein a computer program product for contextual generation of an ephemeral network is provided. The computer program product includes a computer readable storage medium having program instructions embodied therewith, the program instructions being executable by one or more processors to cause the one or more processors to perform operations including detecting an initiating event for network generation. The initiating event is associated with a user of a first computing device. The computer program product determines a duration of the initiating event. The computer program product then determines a set of network members based on the initiating event and the duration. The set of network members are associated with a set of computing devices. The computer program product establishes an ephemeral network connecting the computing devices associated with the set of network members. The computer program product terminates the ephemeral network in response to detecting a completion event and removes member information for the set of network members in response to terminating the ephemeral network.

DETAILED DESCRIPTION

Figure 1:
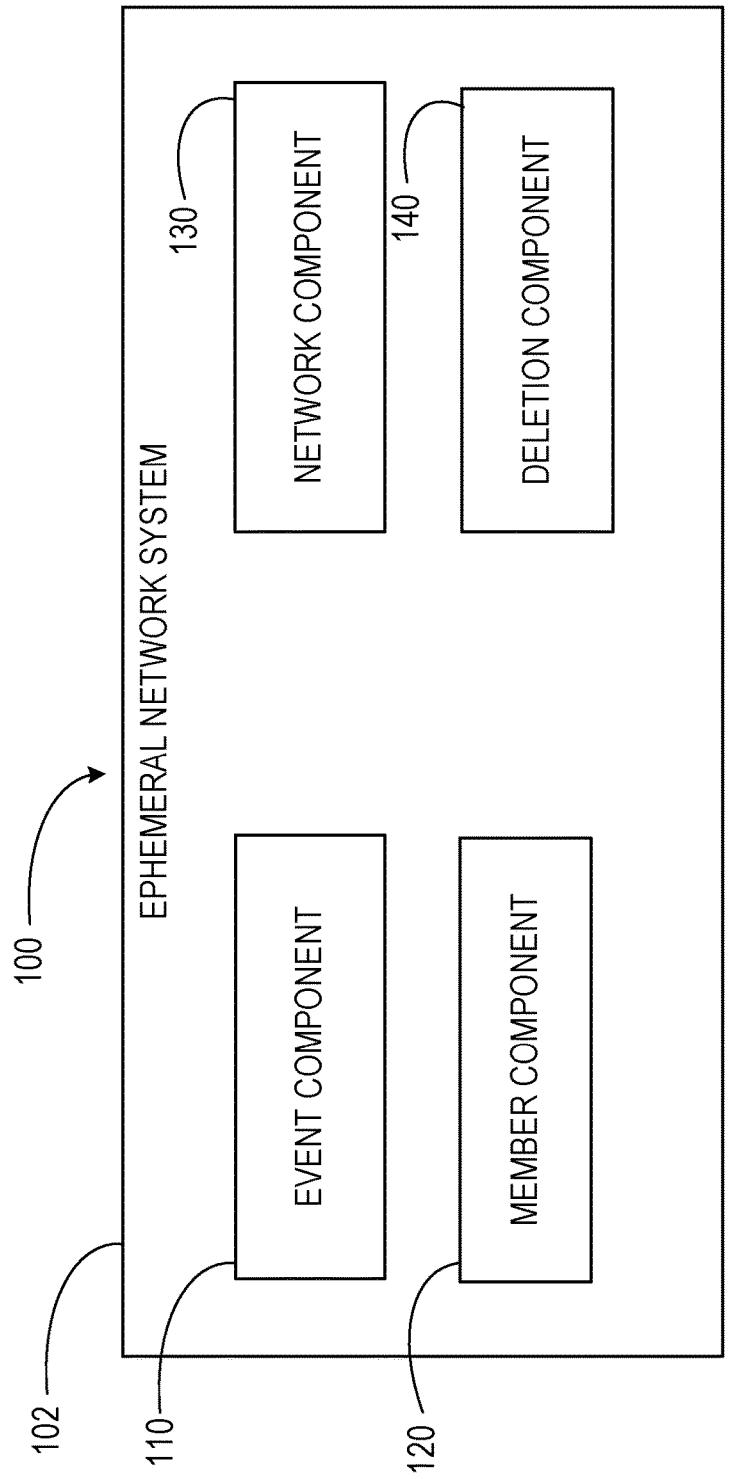
FIG. 1 depicts a block diagram of a computing environment for implementing concepts and computer-based methods, according to at least one embodiment.

The present disclosure relates generally to methods for establishing ephemeral networks, but not exclusively, to a computer-implemented method for contextual generation of an ephemeral network of trusted network nodes and recipients. The present disclosure relates further to a related system for establishing ephemeral networks, and a computer program product for operating such a system.

Many vehicle manufacturers provide vehicle infotainment systems, which present information and provide for interaction with and connectivity to mobile computing devices and other network resources. From self-driving cars that map out routes, to vehicles with WIFI that log network access, to GPS enabled infotainment and navigation systems noting locations of work and home, vehicle data sharing may present data security risks to users, drivers, and passengers alike. The amount and type of data accessed by, shared with, or transmitted through vehicles represents a digital fingerprint or profile of users, drivers, and passengers. This digital fingerprint or profile may be accessed for data theft or inappropriate usage by third parties who gain physical or logical access to the vehicle and its associated data processing or data retention resources. Such data security risks arise where vehicles, and their data processing, storage, and communication resources, are used by multiple users.

For example, a user may temporarily engage in information exchanges with a rental car or a ride sharing vehicle. Users may intentionally or inadvertently upload contact information, song preferences, call history, GPS location details, browsing history or preferences, or any other profile or usage information from a mobile computing device to the vehicle infotainment system or WIFI enabled resources. The data may be persistent in the vehicle's memory and, in some cases, may be shared indiscriminately with others who drive, service, or otherwise access the vehicle. A user's personal data, shared inadvertently or intentionally, may remain on the vehicle with no time or access constraints, unless the data is explicitly removed from the vehicle. Most users fail to explicitly remove their data from temporarily used vehicles. Further, this data persistence may raise issue with some regulatory bodies and laws (e.g., the General Data Protection Regulation (GDPR)) that seek to manage data privacy and data protections.

Embodiments of the present disclosure provide methods, systems, and computer program products for establishing ephemeral networks. The present disclosure enables generation of ephemeral networks of trusted network nodes and recipients. For example, embodiments described in the present disclosure may dynamically provide a mechanism to enable a trusted community of communication partners as recipients for automotive and personal data to access information on an ephemeral, conditional, or time-based basis. Embodiments of the present disclosure deploy a trusted, timed connection for establishing networks and sharing personal or contextual information for a user (e.g., user profile, user profile information, or user personal information). The networks and data sharing protections provided by the present disclosure enable sharing of information between authorized parties and trusted sources of interest based on analysis of a contextual situation.

Embodiments of the present disclosure deploy dynamic blockchain protocols to form a network of authoritative parties for personal or sensitive data sharing. These networks may be ephemeral or sharable based on usage context of the vehicle. Profile/nodal information may stay in the shared network once the context of use (e.g., a vehicle ride or a rental agreement) is terminated. The blockchain network may retain the node. However, data from the vehicle or shared during a network's established duration will be removed based on the ingested or determined parameters for the context of use. Thus, embodiments of the present disclosure may provide a singular method, system, or computer program product to share data discriminately and eradicate the data in a timely and measured manner to prohibit valuable information from being accessed by unintended users. Further, embodiments of the present disclosure enable application of time-based restraints upon the data itself.

Some embodiments of the concepts described herein may take the form of a system or a computer program product. For example, a computer program product may store program instructions that, when executed by one or more processors of a computing system, cause the computing system to perform operations described above with respect to the computer implemented method. By way of further example, the system may comprise components, such as processors and computer readable storage media. The computer readable storage media may interact with other components of the system to cause the system to execute program instructions comprising operations of the computer implemented method, described herein. For the purpose of this description, a computer-usable or computer-readable medium may be any apparatus that may contain means for storing, communicating, propagating, or transporting the program for use, by, or in connection with, the instruction execution system, apparatus, or device.

Referring now to FIG. 1, a block diagram of an example computing environment 100 is shown. The present disclosure may be implemented within the example computing environment 100. In some embodiments, the computing environment 100 may be included within or embodied by a computer system, described below. The computing environment 100 may include an ephemeral network system 102. The ephemeral network system 102 may comprise an event component 110, a member component 120, a network component 130, and a deletion component 140. The event component 110 detects events initiating or terminating establishment of ephemeral networks. The event component 110 may also detect or determine event conditions related to initiating, terminating, or exclusion events. The member component 120 determines network members eligible for access to ephemeral networks. The network component 130 establishes and terminates ephemeral networks. The deletion component 140 deletes data transmitted over or accessible to the ephemeral network upon termination of the ephemeral network. Although described with distinct components, it should be understood that, in at least some embodiments, components may be combined or divided, or additional components may be added, without departing from the scope of the present disclosure.

Figure 2:
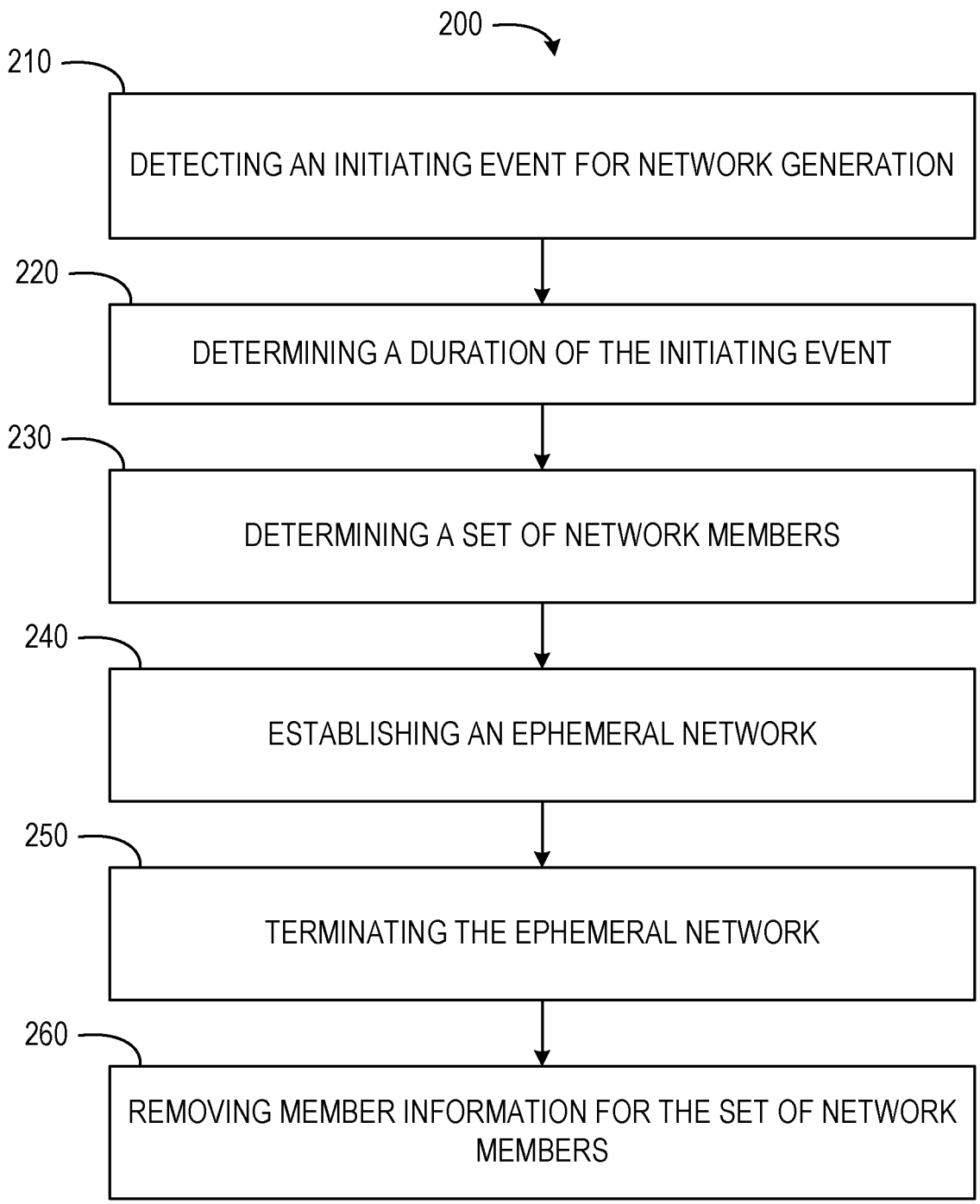
FIG. 2 depicts a flow diagram of a computer-implemented method for contextual generation of an ephemeral network, according to at least one embodiment.

Referring now to FIG. 2, a flow diagram of a computer-implemented method 200 is shown. The computer-implemented method 200 is a method for contextual generation of an ephemeral network. In some embodiments, the computer-implemented method 200 may be performed by one or more components of the computing environment 100, as described in more detail below.

At operation 210, the event component 110 detects an initiating event for network generation. In some embodiments, the initiating event is associated with a user of a first computing device. The initiating event may be detected proximate to a time of network generation. In some embodiments, the initiating event is detected at a time prior to network generation, indicating a later time at which a network is to be generated. Initiating events may be events associated with vehicles such as renting a vehicle, scheduling a rideshare, receiving a loaned vehicle from a vehicle repair establishment, or any other suitable vehicle related event. The event component 110 may detect the initiating event based on direct action of a user, indirect action of a user, or contextual input to the first computing device. For example, an initiating event may be detected by the event component 110 identifying initiation of a vehicle rental agreement, a vehicle purchase, or a rideshare confirmation.

Detection of the initiating event may be performed using one or more sub-operations. In some embodiments, the event component 110 detects the initiating event by identifying a candidate event from contextual input for the first computing device. The candidate event may represent a vehicular activity associated with a specified time (e.g., a starting time). In some embodiments, the event component detects the initiating event through situational or contextual information. Situational or contextual information may be gathered through phone or messaging history, social media interaction, calendar entries, microphone, camera, or application integrations.

For example, the event component 110 may detect the initiating event through Mel Frequency Cepstral Coefficient (MFCC) speech pattern analysis and context extraction using Latent Dirichlet Allocation (LDA) and Natural Language Processing (NLP) infusion to identify, detect, or retrieve speech relating to the initiating event from a phone call, a message, or an email. Similarly, the event component 110 may detect the initiating event through NLP clustering of social media interaction, based on intensity and volume of engagement indicating the initiating event. The event component 110 may detect the initiating event using a microphone of the first computing device using conversational context and immediate communication partners as candidates for communication sharing. The event component 110 may detect the initiating event using the camera by identifying individuals within a vicinity of an ephemeral context which are candidates for information sharing for a duration specified in a given context of a current situation characterized by a location, activity, and time. Application specific integrations may represent partner applications passing initiating event data to the event component 110. For example, a rental car application may pass an indication of a car rental reservation to the event component 110.

In some instances, a bag of words algorithm, and associated topic modeling, is deployed within the event component 110 to generate or determine context based on associative context. Some embodiments of the bag of words algorithm may be understood as shown below in pseudocode.

--- dataset = pd_read_data([doc_text_phone/SMS], [Social media information], [calendar entry], [R-CNN enabled camera context, time])

---

Creating a bag of words model:
from sklearn.feature_extraction.text import CounterVectorizer
cv=CountVectorizer(max_features=n) #n=feature set
X=cv.fit_transform(corpus).toarray( )
Y=dataset.iloc[;5].values #time duration estimation based on initial set of inputs As discussed above, a context or ephemeral situation may be identified based on input to the first computing device. In some embodiments, the event component 110 detects the initiating event based on activity. The event component 110 may detect location, activity (e.g., input, physical action, or logical action) of the first computing device, time, proximity to vehicle, combinations thereof, and other suitable information to determine an activity of a user and detect the initiating event or a candidate initiating event. For example, where a user has rented a car from a rental service, the activity or input related to renting the car may represent the initiating event. A user entering a rideshare agreement, a rideshare vehicle, or a rideshare service network may be determined as activities or input representing the initiating event.

In some embodiments, the event component 110 determines one or more data sharing attributes for the candidate event. The event component 110 may determine data sharing attributes based on activity, input, or context, as described above. In some embodiments, data sharing attributes include privacy permissions for data sharing, network type (e.g., closed network between specified devices or a network capable of enabling connection to third party network resources), authorized device types, network proximity, candidate members, combinations thereof, and any other attributes or characteristics effecting data to be shared across the network. In some embodiments, data sharing attributes include permissions for access of songs, access of SMS messages, access of braking system (e.g., monitoring actions of the braking system), access of steering system (e.g., monitoring actions of the steering system), cooling/heating, environmental preferences, streaming video/music activities, contact information, calendar entries, agenda information, map locations, routing information, marked locations, combinations thereof, and any permissions for sharing any other suitable information capable of being transmitted by one or more of the vehicle and the computing devices associated with network members.

At operation 220, the event component 110 determines a duration of the initiating event. The event component 110 may determine the duration of the initiating event from the input, activities, context, or other data used to determine the duration of the initiating event. In some embodiments, the event component 110 determines the duration of the initiating even directly from data describing the initiating event. For example, where the initiating event is detected through establishment or confirmation of a rental agreement, the event component 110 may determine the duration of the initiating event as a time extending between a scheduled pick up of the rental vehicle and a scheduled drop off of the rental vehicle. In some embodiments, the event component 110 determines the duration of the initiating event by estimating an expected time for the initiating event. For example, where the initiating event is detected through a rideshare confirmation or entering a rideshare vehicle, the event component 110 may determine a predicted trip time for the rideshare. The predicted trip time may be calculated or extracted based on a distance between a starting and ending location, ambient traffic conditions, routing information, combinations thereof, or any other suitable information accessible to the event component 110.

At operation 230, the member component 120 determines a set of network members. The set of network members are associated with a set of computing devices. In some embodiments, the set of network members is determined based on the initiating event and the duration. The set of network members may be determined from one or more parties of a communication indicating the initiating event. For example, where the initiating event is detected from a car rental transaction, the user and a rental car administrator may be candidate members for inclusion in the set of network members. In some embodiments, the set of network members are determined based on proximity to the first computing device of the user. For example, where the initiating event is entry into a rideshare vehicle, candidate members or network members may be determined as users or mobile computing devices within a predetermined or dynamically determined proximity to the first computing device. The set of network members may also be determined based on user data within the first computing device. In some instances, network members are determined based on a contact list of the user on the first computing device, recent communications (e.g., phone calls or SMS messages) stored on the first computing device, combinations thereof, or any other suitable information contained on the first computing device. In some embodiments, combinations of differing data may be used to determine the set of network members. For example, network members may be determined as users or computing devices with which the first computing device has recently communicated, and which are within a close proximity to the first computing device. By way of further example, co-riders in a ride share with whom the first computing device has recently sent or received a message may be determined to be network members.

In some embodiments, the member component 120 determines sharing permissions for the set of network members. Each member of the set of network members may have differing sharing permissions. Sharing permissions may be based on a role or position within the network, a relation to the user or the first computing device for which the network will be generated, or on any suitable attribute or characteristic of each network member. For example, where a rental car administrator is determined as a network member, the rental car administrator may be provided a passive sharing permission. Passive sharing permissions may indicate a network member may be precluded from transmitting information or accessing certain personal information shared on the network. For example, the rental car administrator may have a sharing permission in which only data relating to vehicle safety or vehicle damage is transmitted to the rental car administrator. Sharing permissions may also include active sharing permissions in which a network member may transfer or receive data from other network members. Although active sharing permissions may enable additional interaction between users, in some embodiments, network members with active sharing permissions may still be precluded from accessing personal or identifying information of the user.

The set of network members may be determined using one or more sub-operations. In some embodiments, the member component 120 determines the set of network members by identifying one or more sets of entities or candidate entities for the network. The member component 120 may identify a first set of entities associated with the initiating event. The first set of entities may be parties to a communication representing the initiating event. The first set of entities may include interested parties for the initiating event, such as a representative or quality control agent of a rental car agency or ride share company or an insurance agent. The member component 120 may detect a second set of entities proximate to the first computing device. The second set of entities may be individuals or computing devices positioned within a location determined to be close to the first computing device. Proximity between two computing devices may indicate common purpose, activity, or relationship suitable for inclusion in the network members. The member component 120 may determine a third set of entities based on one or more contextual inputs for the first computing device. The third set of entities may include individuals or computing devices with which the first computing device has recently communicated or with which the first computing device has communicated regarding the initiating event. Although described with a specified number of sets of entities and with specified relationships or roles, it should be understood that the member component 120 may determine any number of sets of entities as candidate entities and such candidate entities may have any suitable relationship with the user or the first computing device.

In some embodiments, the member component 120 determines the set of network members by selecting the set of network members from one or more of the first set of entities, the second set of entities, and the third set of entities. The member component 120 may prune sets of entities or individuals from a given set of entities to determine the set of network members. For example, the member component 120 may remove entities from the set of network members who have not communicated with the first computing device or are not located within a suitable proximity of the first computing device. The member component 120 may determine the set of network members by building a list of entities based on importance, relevance, or matching attributes of the initiating event. In some embodiments, the member component 120 determines the set of network members by building or pruning a list of candidate entities from the first, second, and third set of entities and generating a user interface screen including a representation for each candidate entity. The member component 120 may present the user interface screen at the first computing device and include candidate entities in the set of network members which have been selected by the user of the first computing device.

At operation 240, the network component 130 establishes an ephemeral network. In some embodiments, the ephemeral network connects computing devices associated with the set of network members. The ephemeral network may be a dynamic blockchain-based consensus network. The network component 130 may establish the ephemeral network as an ad hoc network with temporal restrictions, between at least a portion of the set of network members, based on the duration of the initiating event. Once established, data passed through the ephemeral network is tagged and applied to a ledger of the blockchain accordingly. Members of the established ephemeral network may be granted access to chained events and authorized data transferred within the ephemeral network. In some embodiments, members of the ephemeral network are granted access and authoritative access capability within the temporal restrictions (e.g., the duration of the initiating event) of the ephemeral network and within established parameters. Once established, network members connected to the ephemeral network may be authorized to access information associated with sharing attributes and permissions, described above with respect to operation 210.

In some embodiments, establishing the ephemeral network may be performed, at least in part, as shown below in pseudocode.

```
#RiftConsensusAlgorithm for network establishment b/w users
and sharing sensors information/profile preferences
    """Read all sensory/profile data and save data in memory for
    latter usage."""
    required_params = (Userdata = BagofWords(Dataset[1.5],
    Ridesharers_data)
    default_params = { 'sensorReadingsKey': 'sensorReadings' }
    def run(self): #running user's sensory values in the vehicle and
    retaining for future referencing
        for node in self.ReadUser_Network.nodes( ):
            node.memory.update({self.sensorReadingsKey:
            node.compositeSensor.read( )})
```

The network component 130 may establish the ephemeral network based on an occurrence of the initiating event, an action associated with the initiating event, or other suitable trigger. Triggers for each initiating event may be defined by one or more of the initiating event and the duration of the initiating event. In some embodiments, the network component 130 establishes the ephemeral network by determining a current time matches an event time for the initiating event. In such instances, the initiating event may be associated with an event time beginning the initiating event. The network component 130 may detect a vehicle is proximate to the first computing device. The vehicle may be associated with the initiating event.

In some embodiments, when establishing the ephemeral network, the network component 130 generates one or more user interface elements or screens to establish the ephemeral network as a consensus network. The ephemeral consensus network allows network members to opt in or opt out prior to inclusion in or establishment of the ephemeral network. In some embodiments, the network component generates a network permission interface at a first computing device of a user associated with an initiating event. The network component 130 may generate the network permission interface based on determining that a current time matches an event time for the initiating event. The network component 130 may generate the network permission interface based on detecting a vehicle is proximate to the first computing device, where the vehicle is associated with the initiating event. The network permission interface may include a plurality of interface elements. The interface elements may represent a plurality of options including acceptance of access to the ephemeral network, sharing options (e.g., opt in or opt out permissions indicating subject matter the user consents to share), network members for inclusion in the ephemeral network, combinations thereof, or any other suitable network permissions. Upon receiving selection of a user interface element indicating acceptance of a network connection, the network component 130 connects the first computing device to the ephemeral network. In some embodiments, connecting the first computing device to the ephemeral network grants access between the first computing device and one or more communication elements of the vehicle, such as a vehicle WIFI hot spot or the vehicle infotainment system.

The network component 130 may also generate a network permission interface at a set of computing devices associated with the set of network members. The network component 130 may generate the network permission interface for each computing device in a manner similar to or the same as described above. The network component 130 may present the network permission interface at each computing device of the set of computing devices. Upon receiving permission responses from one or more computing devices of the set of computing devices, the network component 130 connects the one or more computing devices to the ephemeral network. In some instances, a set of candidate network members may self-select to further reduce the set of network members allowed to share data across the ephemeral network.

At operation 250, the network component 130 terminates the ephemeral network. In some embodiments, termination of the ephemeral network is performed in response to detecting a completion event. Upon completion or termination of the ephemeral network, or ending of the temporal allowance for the ephemeral network, all access to the set of network members is revoked. Further access to the ephemeral network is denied and restricted according to an agreement established within the blockchain authorization.

In some embodiments, the network component 130 cooperates with one or more other components of the ephemeral network system 102 to determine completion events. The network component 130 may determine a completion event by identifying one or more of a termination time, a termination activity, or a termination condition. Completion events may include termination dates, ending trip times, trip destinations, combinations thereof, and any other suitable event which ends the initiating event. In some instances, the network component 130 identifies a termination time for the initiating event. In such instances, the termination time is based on the duration of the initiating event and an establishing time for the ephemeral network. The network component 130 may then determine a current time matches the termination time for the initiating event. Upon identifying a match between the current time and the termination time, the network component 130 terminates the ephemeral network. In some instances, the network component 130 determines the completion event as arrival at a destination. The network component 130 may access location data for at least one computing device accessing the ephemeral network, and match a current location of the computing device with a destination for a trip associated with the initiating event. Upon identifying a match between a current location and the destination, the network component 130 terminates the ephemeral network.

For example, once a ridesharing service or car rental service is over, based on computation from one or more component of the ephemeral network system 102, the network component 130 terminates the ephemeral network. In some embodiments, the network component 130 terminates the ephemeral network by initiating a destruct or deletion command for blocking access to a node associated with the ephemeral network within the blockchain. In some instances, the destruction or deletion command initiates removal of profile information, described below, from the public ledger.

At operation 260, the deletion component 140 removes member information for the set of network members. In some embodiments, removal of the member information is performed in response to terminating the ephemeral network. The deletion component 140 may remove member information by deleting personal profile information from a public ledger, which is not blockchain based. Removal of the member information deletes personal, private, or sensitive information from the vehicle and returns one or more settings of the infotainment system in the vehicle to a default mode. Node information associated with the ephemeral network may be transmitted to the network component 130 and a private blockchain network. The private blockchain network may only share the node information with authorized or concerned parties of interest.

In some embodiments, the deletion component 140 cooperates with the network component 130 to remove member information. The deletion component 140 may receive a termination indication from the network component 130. The termination indication may represent termination or deconstruction of the ephemeral network by the network component 130. The deletion component 140 may then initiate a deletion command to remove profile information from a public ledger. In some embodiments, once the deletion component 140 deletes, scrubs, overwrites, or otherwise removes the member information, the deletion component 140 may cooperate with the network component 130 to transmit node information to a blockchain network associated with at least one network member of the set of network members. Network members having access to the node information may be administrators of the ephemeral network system 102, insurance administrators, rental car administrators, rideshare administrators, or other entities or network members having suitable permissions or authorization to access anonymized, depersonalized, or other retained information relating to the blockchain retained aspects of the node information.

Figure 3:
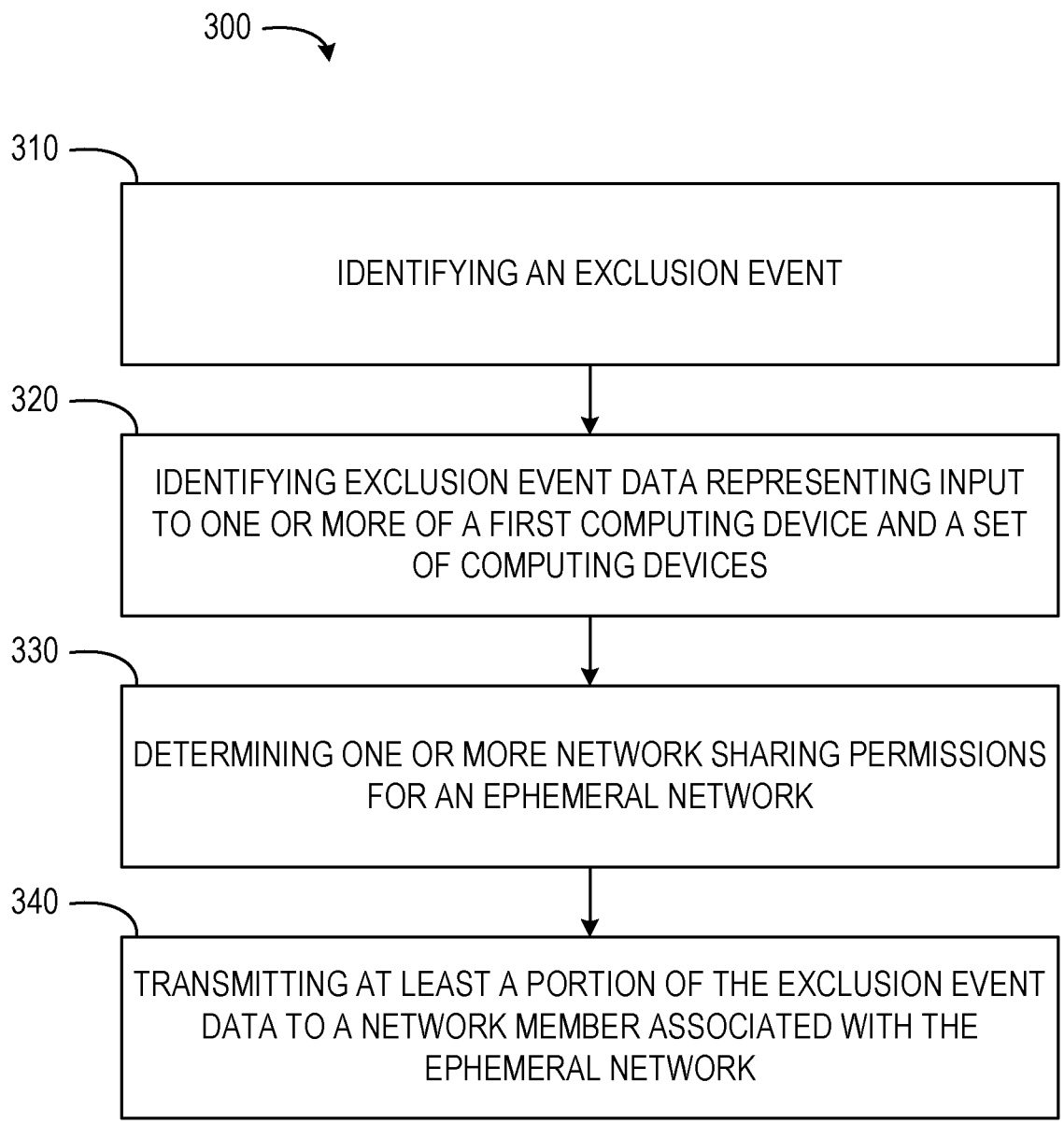
FIG. 3 depicts a flow diagram of a computer-implemented method for contextual generation of an ephemeral network, according to at least one embodiment.

FIG. 3 shows a flow diagram of an embodiment of a computer-implemented method 300 for contextual generation of an ephemeral network. The method 300 may be performed by or within the computing environment 100. In some embodiments, the method 300 comprises or incorporates one or more operations of the method 200. In some instances, operations of the method 300 may be incorporated as part of or sub-operations of the method 200.

In operation 310, the event component 110 identifies an exclusion event. The exclusion event may be identified during a duration of an initiating event. Exclusion events may be events which interrupt the initiating event, the duration of the initiating event, or the completion event. In some instances, an exclusion event may be an airbag deployment, a crash, a prolonged stop, or other indicators of early termination of an expected activity associated with the initiating event. For example, if a vehicle is involved in a collision and an airbag is deployed, an exclusion event is triggered.

In operation 320, the event component 110 identifies exclusion event data representing input to one or more of a first computing device and a set of computing devices. The exclusion event data may be associated with the exclusion event. Exclusion event data may include authorized causational data. For example, information related to braking, speed before airbag deployment, steering actions, infotainment presentations, computing device presentations, combinations thereof, or other suitable information relating to the exclusion event. The exclusion event data may be captured for a time immediately preceding the exclusion event. For example, exclusion event data may be captured and retained for five, ten, fifteen, or thirty seconds prior to the exclusion event. In some instances, a time for which exclusion event data is captured and retained may be controlled by a vehicle black box, the infotainment system, insurance agreements, or combinations thereof.

In operation 330, the network component 130 determines one or more network sharing permissions for the ephemeral network. The sharing permissions may indicate exclusion event data capable of being retained based on one or more agreements, user preferences, network member preferences, or other suitable constraints. Network sharing permissions may be set automatically or may be set manually. In some embodiments, a rental or rideshare agreement may indicate an amount of time and types of data to be retained by the event component 110 in the event of an exclusion event. The network component 130 may access the agreement and determine associated network sharing permissions. The network component 130 may also determine the network sharing permissions by accessing the permissions on a computing device, a network node, or any other suitable storage location.

In operation 340, the network component 130 transmits at least a portion of the exclusion event data to a network member of the set of network members associated with the ephemeral network. In some embodiments, the portion of exclusion event data is transmitted based on the one or more network sharing permissions. The network component 130, based on sharing choices or sharing permissions, may share exclusion event data with a responsible network member such as an insurance entity, a rideshare company, a rental car company, or other suitably responsible network members. In some instances, exclusion event data associated with temporal choices made at a time of the exclusion event may be shared, precluding data captured prior to or after the exclusion event.

In some instances, network sharing permissions may be overridden. Where network sharing permissions exclude sharing information relating to driving actions, an exclusion event indicating early termination of a vehicle trip due to accident or erratic actions may cause the network component 130 and the event component 110 to override the network sharing permissions. In such instances, the exclusion event data which is associated with an override condition (e.g., indications of dangerous activities or accident) may be retained and transmitted the network member.

Embodiments of the present disclosure enable secured interactions with varying networked devices in a time-limited manner, removing private or sensitive data once access to the network is terminated. For example, a couple engaging in driving and sharing one or more profiles with a vehicle infotainment system. Initially, a first user profile is shared with a second user profile, inclusive of song collections, messages, and other information. The information may be inherently shared with other users within the context of the trip. Once the travel experience has ended, the shared information between the first user and the second user can be deleted, continued, or archived according to user preferences. By way of further example, embodiments of the present disclosure enable a first user, entering a rideshare vehicle with other individuals with whom the first user would like to share data for the duration of the ride, to establish a temporary network and share certain information. During the course of the time-established ride, sharing may be performed by the first user and other users within the rideshare vehicle. Upon an established termination of the rideshare time, all sharing and communication between shared users is terminated and deleted. The blockchain may be used as a mechanism to acknowledge that previously established users are no longer granted access to privileged information based on time constraints. Embodiments of the present disclosure may enable a user to establish a long-term relationship with an established network of participants to access vehicular and cellular data within a particular vehicle. After a life of the vehicle has expired (e.g., transfer of ownership, destruction, etc.), all data associated with the vehicle is expunged from participant records.

Figure 4:
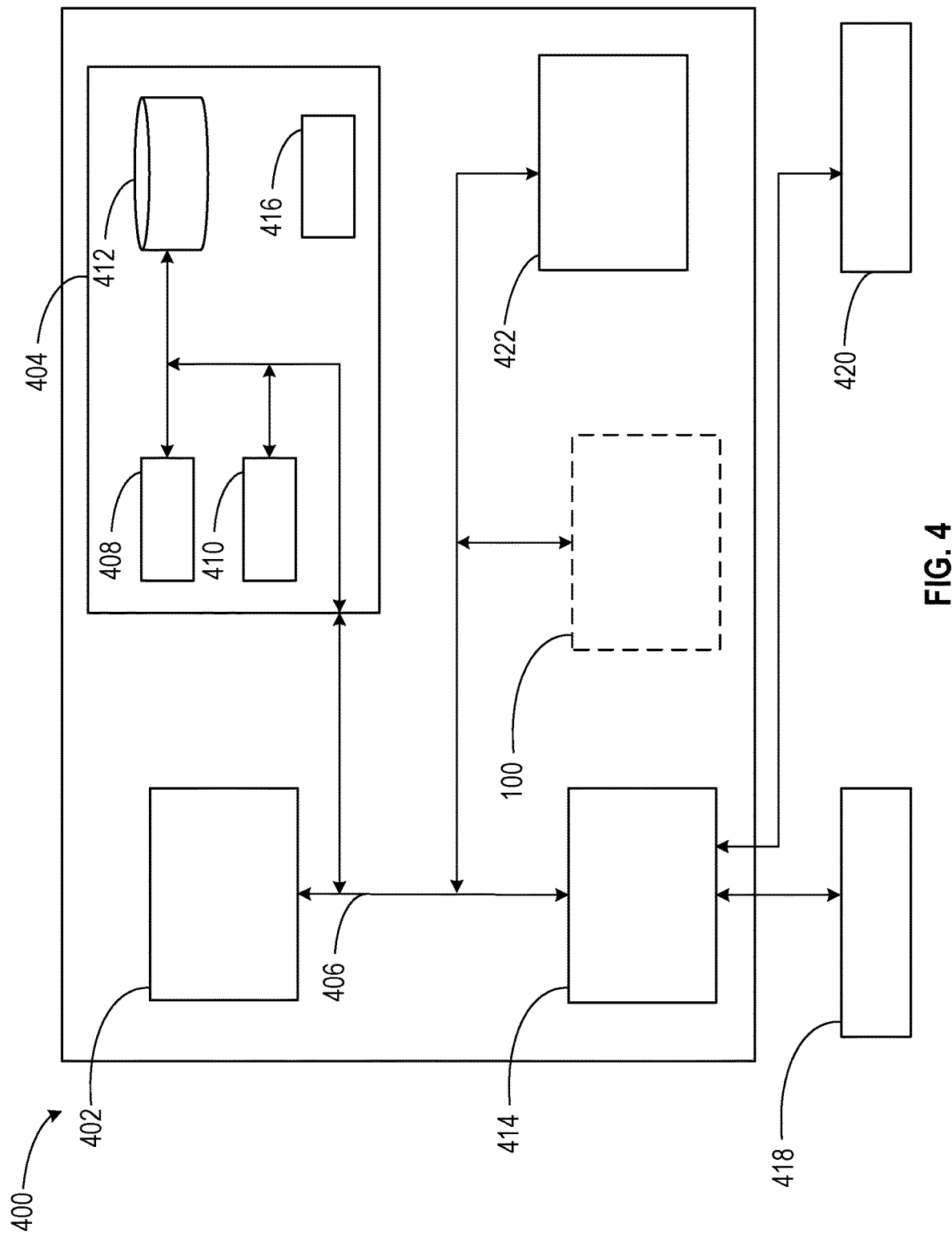
FIG. 4 depicts a block diagram of a computing system for contextual generation of an ephemeral network, according to at least one embodiment.

Embodiments of the present disclosure may be implemented together with virtually any type of computer, regardless of the platform being suitable for storing and/or executing program code. FIG. 4 shows, as an example, a computing system 400 (e.g., cloud computing system) suitable for executing program code related to the methods disclosed herein and for contextual generation of an ephemeral network.

The computing system 400 is only one example of a suitable computer system and is not intended to suggest any limitation as to the scope of use or functionality of embodiments of the present disclosure described herein, regardless, whether the computer system 400 is capable of being implemented and/or performing any of the functionality set forth hereinabove. In the computer system 400, there are components, which are operational with numerous other general purpose or special purpose computing system environments or configurations. Examples of well-known computing systems, environments, and/or configurations that may be suitable for use with computer system/server 400 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 400 may be described in the general context of computer system-executable instructions, such as program modules, being executed by a computer system 400. Generally, program modules may include routines, programs, objects, components, logic, data structures, and so on that perform particular tasks or implement particular abstract data types. Computer system/server 400 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 400 is shown in the form of a general-purpose computing device. The components of computer system/server 400 may include, but are not limited to, one or more processors 402 (e.g., processing units), a system memory 404 (e.g., a computer-readable storage medium coupled to the one or more processors), and a bus 406 that couple various system components including system memory 404 to the processor 402. Bus 406 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 400 typically includes a variety of computer system readable media. Such media may be any available media that is accessible by computer system/server 400, and it includes both, volatile and non-volatile media, removable and non-removable media.

The system memory 404 may include computer system readable media in the form of volatile memory, such as random-access memory (RAM) 408 and/or cache memory 410. Computer system/server 400 may further include other removable/non-removable, volatile/non-volatile computer system storage media. By way of example only, a storage system 412 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 406 by one or more data media interfaces. As will be further depicted and described below, the system memory 404 may include at least one program product having a set (e.g., at least one) of program modules that are configured to carry out the functions of embodiments of the present disclosure.

The program/utility, having a set (at least one) of program modules 416, may be stored in the system memory 404 by way of example, and not limiting, as well as an operating system, one or more application programs, other program modules, and program data. Program modules may include one or more of the event component 110, the member component 120, the network component 130, and the deletion component 140, which are illustrated in FIG. 1. Each of the operating systems, one or more application programs, other program modules, and program data or some combination thereof, may include an implementation of a networking environment. Program modules 416 generally carry out the functions and/or methodologies of embodiments of the present disclosure, as described herein.

The computer system/server 400 may also communicate with one or more external devices 418 such as a keyboard, a pointing device, a display 420, etc.; one or more devices that enable a user to interact with computer system/server 400; and/or any devices (e.g., network card, modem, etc.) that enable computer system/server 400 to communicate with one or more other computing devices. Such communication can occur via Input/Output (I/O) interfaces 414. Still yet, computer system/server 400 may communicate with one or more networks such as a local area network (LAN), a general wide area network (WAN), and/or a public network (e.g., the Internet) via network adapter 422. As depicted, network adapter 422 may communicate with the other components of computer system/server 400 via bus 406. It should be understood that, although not shown, other hardware and/or software components could be used in conjunction with computer system/server 400. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Service models may include software as a service (SaaS), platform as a service (PaaS), and infrastructure as a service (IaaS). In SaaS, the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings. In PaaS, the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. In IaaS, the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment models may include private cloud, community cloud, public cloud, and hybrid cloud. In private cloud, the cloud infrastructure is operated solely for an organization. It may be managed by the organization or a third party and may exist on-premises or off-premises. In community cloud, the cloud infrastructure is shared by several organizations and supports specific community that has shared concerns (e.g., mission, security requirements, policy, and compliance considerations). It may be managed by the organizations or a third party that may exist on-premises or off-premises. In public cloud, the cloud infrastructure is made available to the general public or a large industry group and is owned by an organization selling cloud services. In hybrid cloud, the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling modularity, and semantic interoperability. At the heart of cloud computing is an infrastructure that includes a network of interconnected nodes.

Figure 5:
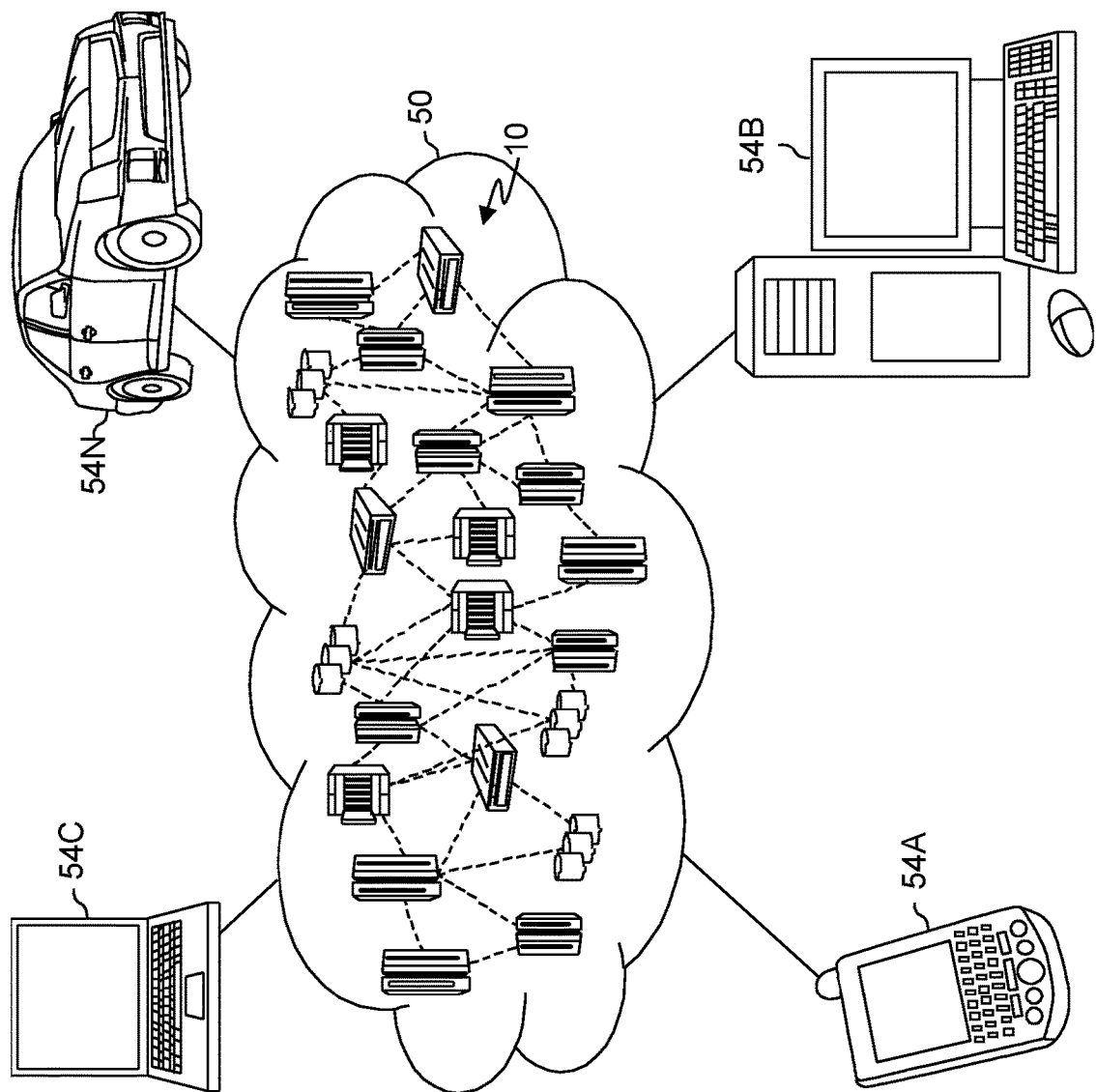
FIG. 5 is a schematic diagram of a cloud computing environment in which concepts of the present disclosure may be implemented, in accordance with an embodiment of the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
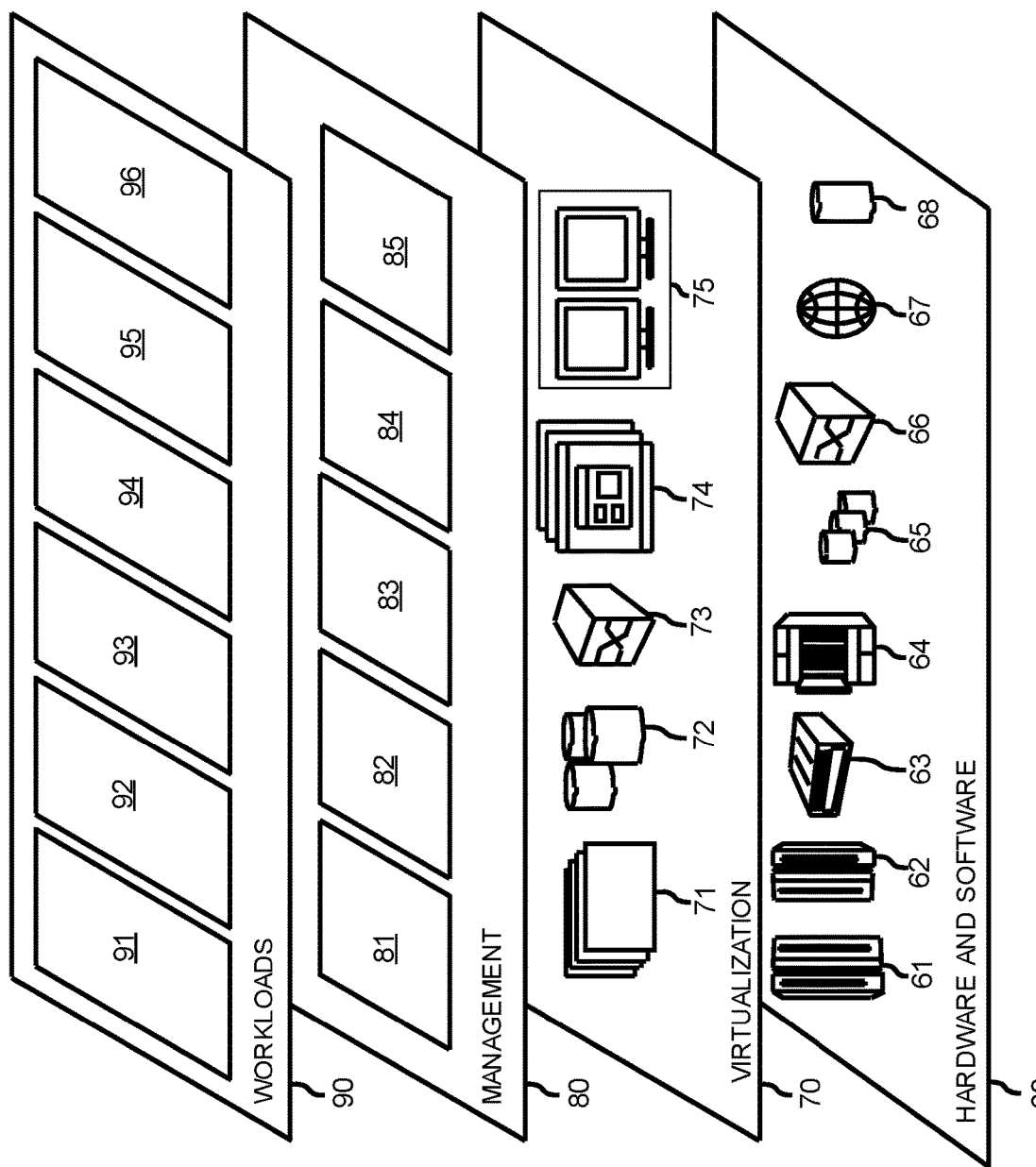
FIG. 6 is a diagram of model layers of a cloud computing environment in which concepts of the present disclosure may be implemented, in accordance with an embodiment of the present disclosure.

Referring now to FIG. 6, a set of functional abstraction layers provided by cloud computing environment 50 (FIG. 5) is shown. It should be understood in advance that the components, layers, and functions shown in FIG. 5 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and network traffic direction processing 96.

Cloud models may include characteristics including on-demand self-service, broad network access, resource pooling, rapid elasticity, and measured service. In on-demand self-service a cloud consumer may unilaterally provision computing capabilities such as server time and network storage, as needed automatically without requiring human interaction with the service's provider. In broad network access, capabilities are available over a network and accessed through standard mechanisms that promote use by heterogeneous thin or thick client platforms (e.g., mobile phones, laptops, and PDAs). In resource pooling, the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). In rapid elasticity, capabilities can be rapidly and elastically provisioned, in some cases automatically, to quickly scale out and rapidly released to quickly scale in. To the consumer, the capabilities available for provisioning often appear to be unlimited and can be purchased in any quantity at any time. In measured service, cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

The descriptions of the various embodiments of the present disclosure have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer-readable storage medium (or media) having computer readable program instructions thereon for causing a processor to carry out aspects of the present invention.

The computer-readable storage medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer-readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present disclosure has been presented for purposes of illustration and description, but is not intended to be exhaustive or limited to the present disclosure in the form disclosed. Many modifications and variations will be apparent to those of ordinary skills in the art without departing from the scope of the present disclosure. The embodiments are chosen and described in order to explain the principles of the present disclosure and the practical application, and to enable others of ordinary skills in the art to understand the present disclosure for various embodiments with various modifications, as are suited to the particular use contemplated.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    detecting an initiating event for network generation, the initiating event associated with a user of a first computing device;
    determining a duration of the initiating event;
    determining a set of network members based on the initiating event and the duration, the set of network members associated with a set of computing devices;
    establishing an ephemeral network connecting at least a portion of the computing devices associated with the set of network members;
    terminating the ephemeral network in response to detecting a completion event; and
    removing member information from the portion of the computing devices associated with the set of network members in response to terminating the ephemeral network.

2. The method of claim 1, wherein detecting the initiating event further comprises:
    identifying a candidate event from a set of contextual inputs for the first computing device, the candidate event representing a vehicular activity associated with a specified time; and
    determining one or more data sharing attributes for the candidate event.

3. The method of claim 1, wherein determining the set of network members further comprises:
    identifying a first set of entities associated with the initiating event;
    detecting a second set of entities proximate to the first computing device;
    determining a third set of entities based on one or more contextual inputs for the first computing device; and
    selecting the set of network members from one or more of the first set of entities, the second set of entities, and the third set of entities.

4. The method of claim 1, wherein the ephemeral network is a dynamic blockchain-based consensus network, and establishing the ephemeral network further comprises:
    generating a network permission interface at the set of computing devices associated with the set of network members;
    receiving a permission response from one or more computing devices of the set of computing devices; and
    connecting the one or more computing devices to the ephemeral network.

5. The method of claim 1, wherein determining the completion event further comprises:
    identifying a termination time for the initiating event, the termination time based on the duration of the initiating event and an establishing time for the ephemeral network; and
    determining a current time matches the termination time for the initiating event.

6. The method of claim 1, wherein the ephemeral network is a dynamic blockchain-based consensus network, and terminating the ephemeral network further comprises:
    initiating a deletion command to remove profile information from a public ledger; and
    transmitting node information to a blockchain network associated with at least one network member of the set of network members.

7. The method of claim 1, wherein the method further comprises:
    identifying an exclusion event during the duration of the initiating event;
    identifying exclusion event data representing input to one or more of the set of computing devices, the exclusion event data associated with the exclusion event;
    determining one or more network sharing permissions for the ephemeral network; and
    based on the one or more network sharing permissions, transmitting at least a portion of the exclusion event data to a network member of the set of network members.

8. A system, comprising:
    one or more processors; and
    a computer-readable storage medium, coupled to the one or more processors, storing program instructions that, when executed by the one or more processors, cause the one or more processors to perform operations comprising:
        detecting an initiating event for network generation, the initiating event associated with a user of a first computing device;
        determining a duration of the initiating event;
        determining a set of network members based on the initiating event and the duration, the set of network members associated with a set of computing devices;
        establishing an ephemeral network connecting at least a portion of the computing devices associated with the set of network members;
        terminating the ephemeral network in response to detecting a completion event; and removing member information from the portion of the computing devices associated with the set of network members in response to terminating the ephemeral network.

9. The system of claim 8, wherein detecting the initiating event further comprises:
identifying a candidate event from a set of contextual inputs for the first computing device, the candidate event representing a vehicular activity associated with a specified time; and
determining one or more data sharing attributes for the candidate event.

10. The system of claim 8, wherein determining the set of network members further comprises:
identifying a first set of entities associated with the initiating event;
detecting a second set of entities proximate to the first computing device;
determining a third set of entities based on one or more contextual inputs for the first computing device; and
selecting the set of network members from one or more of the first set of entities, the second set of entities, and the third set of entities.

11. The system of claim 8, wherein the ephemeral network is a dynamic blockchain-based consensus network, and establishing the ephemeral network further comprises:
generating a network permission interface at the set of computing devices associated with the set of network members;
receiving a permission response from one or more computing devices of the set of computing devices; and
connecting the one or more computing devices to the ephemeral network.

12. The system of claim 8, wherein determining the completion event further comprises:
identifying a termination time for the initiating event, the termination time based on the duration of the initiating event and an establishing time for the ephemeral network; and
determining a current time matches the termination time for the initiating event.

13. The system of claim 8, wherein the ephemeral network is a dynamic blockchain-based consensus network, and terminating the ephemeral network further comprises:
initiating a deletion command to remove profile information from a public ledger; and
transmitting node information to a blockchain network associated with at least one network member of the set of network members.

14. The system of claim 8, wherein the operations further comprise:
identifying an exclusion event during the duration of the initiating event;
identifying exclusion event data representing input to one or more of the set of computing devices, the exclusion event data associated with the exclusion event;
determining one or more network sharing permissions for the ephemeral network; and
based on the one or more network sharing permissions, transmitting at least a portion of the exclusion event data to a network member of the set of network members.

15. A computer program product comprising a computer readable storage medium having program instructions embodied therewith, the program instructions being executable by one or more processors to cause the one or more processors to perform operations comprising:
detecting an initiating event for network generation, the initiating event associated with a user of a first computing device;
determining a duration of the initiating event;
determining a set of network members based on the initiating event and the duration, the set of network members associated with a set of computing devices;
establishing an ephemeral network connecting at least a portion of the computing devices associated with the set of network members;
terminating the ephemeral network in response to detecting a completion event; and
removing member information from the portion of the computing devices associated with the set of network members in response to terminating the ephemeral network.

16. The computer program product of claim 15, wherein detecting the initiating event further comprises:
identifying a candidate event from a set of contextual inputs for the first computing device, the candidate event representing a vehicular activity associated with a specified time; and
determining one or more data sharing attributes for the candidate event.

17. The computer program product of claim 15, wherein determining the set of network members further comprises:
identifying a first set of entities associated with the initiating event;
detecting a second set of entities proximate to the first computing device;
determining a third set of entities based on one or more contextual inputs for the first computing device; and
selecting the set of network members from one or more of the first set of entities, the second set of entities, and the third set of entities.

18. The computer program product of claim 15, wherein the ephemeral network is a dynamic blockchain-based consensus network, and establishing the ephemeral network further comprises:
generating a network permission interface at the set of computing devices associated with the set of network members;
receiving a permission response from one or more computing devices of the set of computing devices; and
connecting the one or more computing devices to the ephemeral network.

19. The computer program product of claim 15, wherein determining the completion event further comprises:
identifying a termination time for the initiating event, the termination time based on the duration of the initiating event and an establishing time for the ephemeral network; and
determining a current time matches the termination time for the initiating event.

20. The computer program product of claim 15, wherein the ephemeral network is a dynamic blockchain-based consensus network, and terminating the ephemeral network further comprises:
initiating a deletion command to remove profile information from a public ledger; and
transmitting node information to a blockchain network associated with at least one network member of the set of network members.

* * * * *